R. H. HOWARTH.
STUFFING BOX PACKING.
APPLICATION FILED APR. 29, 1911.
1,013,017.
Patented Dec. 26, 1911.
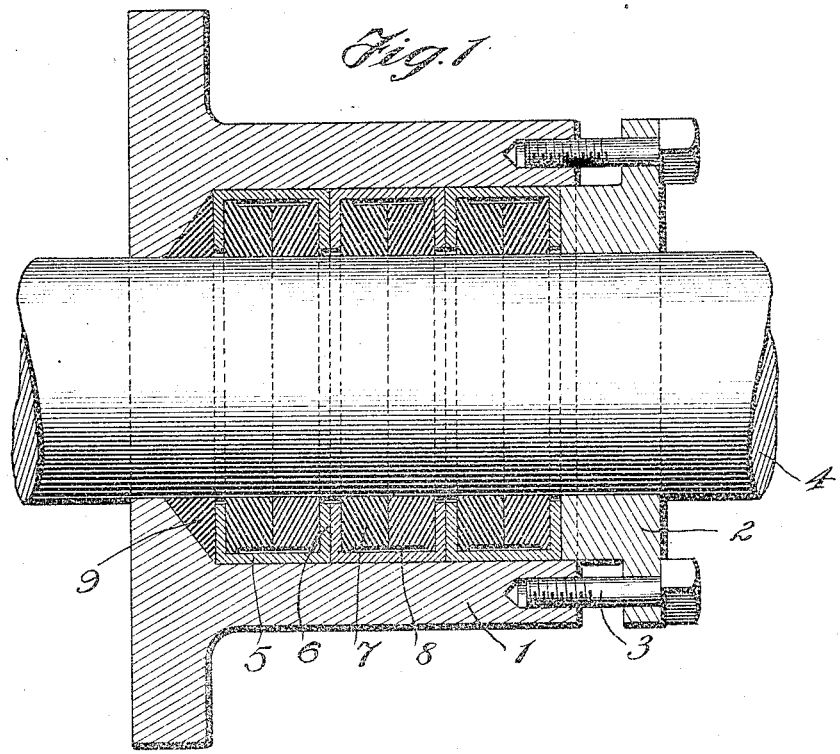
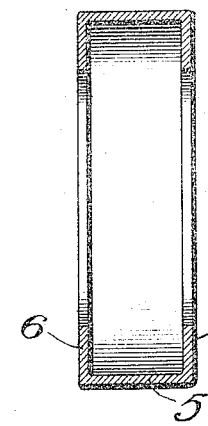
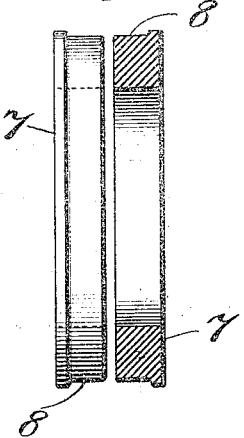
Witnesses
W. Max. Durall.
G. Ehunstan
Inventor
R. H. Howarth
W. Wilkinson,
his Attorneys

UNITED STATES PATENT OFFICE.

ROBERT H. HOWARTH, OF ROTHSCHILD, WISCONSIN.

STUFFING-BOX PACKING.

1,013,017.

Specification of Letters Patent.  Patented Dec. 26, 1911.

Application filed April 29, 1911.  Serial No. 624,167.

*To all whom it may concern:*

Be it known that I, ROBERT H. HOWARTH, a citizen of the United States, residing at Rothschild, in the county of Marathon and State of Wisconsin, have invented certain new and useful Improvements in Stuffing-Box Packing; and I do hereby declare the following to be a full, clear, and exact description of the invention, such as will enable others skilled in the art to which it appertains to make and use the same.

This invention relates to improvements in packings for stuffing boxes, and has for its object to provide packings which may be fitted in ordinary stuffing boxes to avoid the necessity of furnishing special glands.

With the above and other objects in view, the invention consists in certain combinations and arrangements of the parts hereinafter described, and the novel features thereof will be particularly pointed out in the appended claim.

The preferred embodiment of the invention is illustrated in the accompanying drawings in which like characters of reference designate corresponding parts.

Figure 1 is a longitudinal section of a stuffing box showing packing embodying my invention arranged therein. Fig. 2 is a sectional view of a packing casing, and Fig. 3 shows an elevation and a sectional view of a pair of packing rings.

In the drawings 1 represents a stuffing box of ordinary construction, and 2 the gland which is removably secured to the stuffing box by bolts 3 in the usual manner.

4 represents a shaft passing through the stuffing box.

Slidably fitting the bore of the stuffing box 1 are a plurality of packing casings 5 of a corresponding diameter, and having inwardly turned right angular flanges 6 of a bore slightly greater than the diameter of the shaft 4. Each casing 5 is provided with a pair of packing rings 7 of suitable material, which fill the space between the flanges 6 and snugly engage the shaft 4 to prevent leaking around same. The outer diameter of each packing ring is preferably reduced, as at 8, to increase their resiliency and thereby reduce the friction.

In order to prevent leaking between the casings and the stuffing box, a suitable ring of packing 9 is provided at the bottom of the stuffing box.

As the application of my improved packing will be readily understood by those skilled in the art, it is thought further explanation is not necessary.

It is to be understood that slight changes in the form, proportion and minor details of construction may be resorted to without sacrificing any of the advantages or departing from the spirit of the invention.

Having fully described my invention what I claim is:—

The combination with a stuffing box and a gland therefor of a packing comprising a plurality of casings having inwardly turned flanges, a pair of contacting packing rings in each casing and fitting between the flanges thereof, each packing ring having the inner portion of its outer diameter reduced thereby forming a flange on the outer edge thereof whereby a space is left between the reduced diameters of the rings and their casing, and packing means at the bottom of the stuffing box to prevent leaking past the casings, substantially as described.

In testimony whereof, I affix my signature, in presence of two witnesses.

ROBERT H. HOWARTH.

Witnesses:
JOHN H. KRESS,
ED HOWARTH.